US010378981B2

(12) United States Patent
Ikeda et al.

(10) Patent No.: US 10,378,981 B2
(45) Date of Patent: Aug. 13, 2019

(54) METHOD FOR ANALYZING LOAD CHARACTERISTIC AND ANALYSIS MODEL CREATION APPARATUS

(71) Applicant: FUJI JUKOGYO KABUSHIKI KAISHA, Tokyo (JP)

(72) Inventors: Satoshi Ikeda, Tokyo (JP); Mitsumasa Kuwabara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/277,134

(22) Filed: Sep. 27, 2016

(65) Prior Publication Data
US 2017/0089780 A1 Mar. 30, 2017

(30) Foreign Application Priority Data
Sep. 28, 2015 (JP) ................ 2015-189837

(51) Int. Cl.
G06F 17/50 (2006.01)
G01L 5/00 (2006.01)
B32B 1/08 (2006.01)
B32B 5/26 (2006.01)
(Continued)

(52) U.S. Cl.
CPC .............. G01L 5/0052 (2013.01); B32B 1/08 (2013.01); B32B 5/26 (2013.01); B32B 2260/023 (2013.01); B32B 2260/046 (2013.01); B32B 2262/106 (2013.01); B32B 2307/56 (2013.01); B32B 2605/08 (2013.01); B60R 19/34 (2013.01); B62D 21/152 (2013.01); G06F 17/50 (2013.01); G06F 17/5009 (2013.01); G06F 17/5018 (2013.01); G06F 2217/44 (2013.01)

(58) Field of Classification Search
CPC .. G06F 17/5018; G06F 17/5509; G06F 17/50; G06F 2217/44
USPC ...................... 702/41–43; 703/6–7
See application file for complete search history.

(56) References Cited

U.S. PATENT DOCUMENTS 5,677,846 A * 10/1997 Kumashiro ............. G06T 17/20
703/14
7,043,413 B2 * 5/2006 Ward ..................... G01V 11/00
702/5
(Continued)

FOREIGN PATENT DOCUMENTS

CN 102667804 A 9/2012
JP 2007-249643 A 9/2007
(Continued)

OTHER PUBLICATIONS

Hou et al. "Multiobjective optimization for tapered circular tubes". Thin-Walled Structures, vol. 49, 2011. [Online] Mar. 21, 2011. <http://www.sciencedirect.com/science/article/pii/S0263823111000498>.*

(Continued)

Primary Examiner — Jonathan M Dunlap
(74) Attorney, Agent, or Firm — Chip Law Group

(57) ABSTRACT

A load analysis includes analyzing, based on a finite element method, a load characteristic when a load is inputted to a cylindrical object to be analyzed in an axial direction, and for the analyzing, applying an analysis model in which a disposition direction of mesh cells of the analysis model is inclined with respect to the axial direction.

7 Claims, 11 Drawing Sheets

(51) Int. Cl.
*B60R 19/34* (2006.01)
*B62D 21/15* (2006.01)

(56) References Cited

U.S. PATENT DOCUMENTS

| | | | | |
|---|---|---|---|---|
| 7,716,024 | B2* | 5/2010 | Hultgren | G06T 19/20 |
| | | | | 703/6 |
| 9,811,616 | B2* | 11/2017 | Pena | G06F 17/5018 |
| 2010/0138195 | A1* | 6/2010 | Onodera | G06T 17/20 |
| | | | | 703/1 |
| 2012/0221302 | A1 | 8/2012 | Lewandowski et al. | |
| 2015/0170022 | A1* | 6/2015 | Malik | G01N 3/30 |
| | | | | 706/21 |
| 2016/0098503 | A1* | 4/2016 | Pena | G06F 17/5018 |
| | | | | 703/2 |

FOREIGN PATENT DOCUMENTS

| | | | |
|---|---|---|---|
| JP | 2007272557 A | * | 10/2007 |
| JP | 2008-033689 A | | 2/2008 |
| JP | 2010-237733 A | | 10/2010 |

OTHER PUBLICATIONS

Khan et al. "Evalution of Composite Tapered Cone for Tosion using Finite Element Analysis". International Journal of Science and Research, vol. 3, Issue 7, Jul. 2014. <https://www.ijsr.net/archive/v3i7/MDIwMTQxMDk0.pdf>.*

Benzley et al. "Pre- and post-processing for the finite element method" Finite Elements in Analysis and Design, vol. 19 (1995). p. 243-260.*

Weck et al. "Finite Element Method" Massachuseetts Institute of Technology. Jan. 12, 2004 <http://web.mit.edu/16.810/www/16.810_L4_CAE.pdf>.*

George, Alan. "Computer Implementation of The Finite Element Method". 1971 <http://www.dti.mil/dtic/tr/fulltext/u2/726171.pdf>.*

Bathe, Klaus-Jurgen. "The Finite Element Method". Wiley Encyclopedia of Computer Science and Engineering. 2008. <https://onlinelibrary.wiley.com/doi/pdf/10.1002/9780470050118.ecse159>.*

Office Action received for Japanese Patent application No. 2015-189837, dated Jul. 12, 2016, 5 pages of office action including 3 pages of English translation.

Tsuzikami, et al., "Intelligent Finite Element Method Applied to Design of Actual Composite Structures" The Society of Materials Science, Japan, vol. 46, No. 4, Apr. 15, 1997, pp. 343-348.

Tateishi, et al., "A Numerical Model for the Crush-Worthiness Analysis Designed for FRP Materials with Progressive Crushing Behavior" The Society of Materials Science, Japan, vol. 51, No. 5, May 15, 2002, pp. 506-511.

Otsuka, et al., "Study on the Bending of FRP Cylinders" Japan Society of Mechanical Engineers collected-papers, A-Edition, Japan, the general Japan Society of Mechanical Engineers, Feb. 25, 2003, vol. 69, No. 678, pp. 251-256.

Dffice Action for CN Patent Application No. 201610851373.9, dated Dec. 20, 2017, 06 pages of Office Action.

Tsujikami, et al., "Intelligent Finite Element Method Applied to Design of Actual Composite Structures", The Society of Materials Science, Apr. 30, 1997, p. 343-348, vol. 46, No. 4.

* cited by examiner

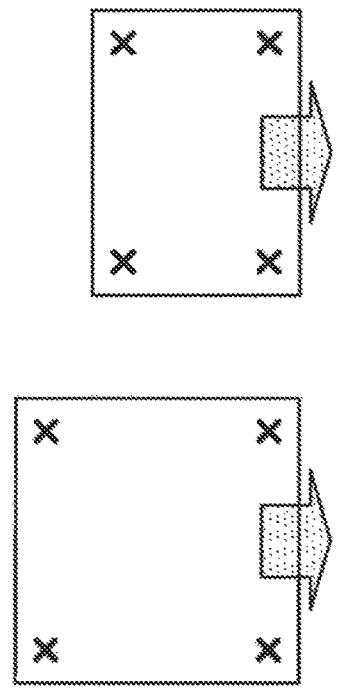
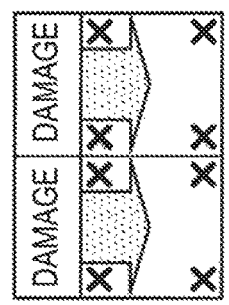
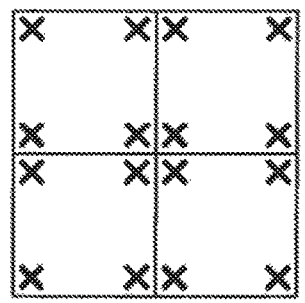
FIG. 5

METHOD FOR ANALYZING LOAD CHARACTERISTIC AND ANALYSIS MODEL CREATION APPARATUS

CROSS REFERENCE TO RELATED APPLICATIONS

This application claims priority benefit of Japanese Patent Application No. JP 2015-189837 filed in the Japan Patent Office on Sep. 28, 2015. Each of the above-referenced applications is hereby incorporated herein by reference in its entirety.

BACKGROUND

1. Technical Field

The present invention relates to a method for analyzing a load characteristic of a cylindrical object to be analyzed and an analysis model creation apparatus.

2. Related Art

A vehicle is equipped with an energy absorbing member that, at the time of the occurrence of collision, is crushed and absorbs the collision energy. As a typical example of the energy absorbing member, a crash box disposed between a front bumper beam and a front frame is given. Conventionally, an energy absorbing member made of a metal material such as a steel sheet has been used; but these days, an energy absorbing member made of a fiber-reinforced resin in which carbon fibers are mixed (CFRP) is in practical use in order to reduce the weight of the car body.

Such an energy absorbing member made of a CFRP forms a cylindrical shape; and when a collision load is inputted in the axial direction, the energy absorbing member is crushed while being squashed continuously in an outward or inward winding manner. A crash box formed of a steel sheet is squashed while being buckled at relatively large intervals; on the other hand, the energy absorbing member made of a CFRP is continuously squashed, and therefore, also in terms of load characteristics, has the advantage that the crushing load is stable.

As a computer-aided engineering (CAE) technology that analyzes the load characteristic at the time of the axial crushing of such an energy absorbing member made of a CFRP, there is a method in which an analysis model of the energy absorbing member is constructed by a mesh pattern and an analysis is performed by the finite element method. The finite element method is a simulation method using a computer in which a structure body to be analyzed having infinite degrees of freedom is virtually divided into a finite number of mesh cells and the deformation of each mesh cell due to collision is analyzed by simulation. In general, the mesh cells used for the collision analysis by the finite element method are disposed in the axial direction, which is the direction in which a load is inputted, and the direction orthogonal to the axial direction (see, for example, Japanese Unexamined Patent Application Publication (JP-A) No. 2007-249643 and JP-A No. 2008-33689).

However, when an analysis is performed using a conventional mesh pattern, there is a case where a variation range of crushing load, which is originally supposed to transition stably, appears greatly and the degree of reproducibility of the analysis result with respect to the actual object to be analyzed is low. In particular, depending on the size of the mesh cell, there has been a case where spike peaks appear in the load characteristic at intervals corresponding to the length of one side of the mesh cell, and the variation of crushing load is further increased.

SUMMARY OF THE INVENTION

It is desirable to provide a novel and improved method for analyzing a load characteristic and an analysis model creation apparatus that make it possible to improve the degree of reproducibility of the load characteristic of a cylindrical object to be analyzed.

An aspect of the present invention provides a method for analyzing a load characteristic that analyzes, based on a finite element method, a load characteristic when a load is inputted to a cylindrical object to be analyzed in an axial direction, the method for analyzing a load characteristic including: using an analysis model in which a disposition direction of mesh cells of the analysis model is inclined with respect to the axial direction.

The disposition direction of mesh cells may be inclined with respect to the axial direction by 45 degrees.

The mesh cell may be a quadrangular mesh cell.

The object to be analyzed composed of a plurality of layers may be reproduced by one analysis model.

The object to be analyzed having, at an axial end on a side that receives the load, a tapered portion in which an outer diameter becomes smaller with increasing proximity to the axial end may be used as the object to be analyzed.

The object to be analyzed may be an energy absorbing member made of a carbon fiber-reinforced plastic.

Another aspect of the present invention provides an analysis model creation apparatus that creates an analysis model of a cylindrical object to be analyzed in order to analyze a load characteristic of the object to be analyzed by a finite element method. An analysis model is created by a mesh pattern in which mesh cells are disposed in a direction inclined with respect to an axial direction of the cylindrical object to be analyzed.

BRIEF DESCRIPTION OF THE DRAWINGS

FIG. 5 illustrates the difference in the deformation of the mesh depending on the number of division of the mesh;

DETAILED DESCRIPTION

Figure 1:
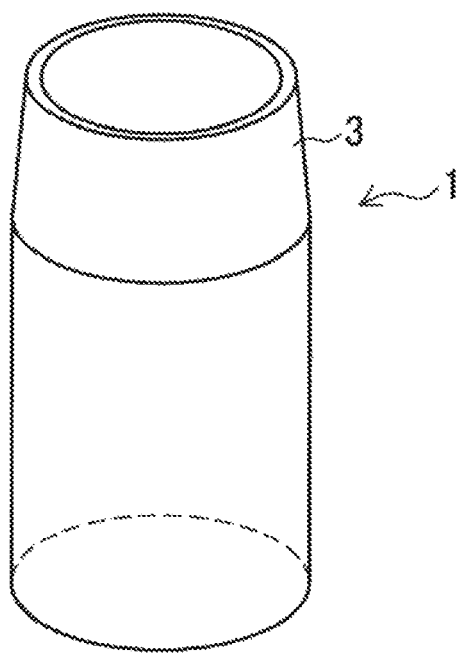
FIG. 1 illustrates an energy absorbing member that is an example of the object to be analyzed.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

<1. Example of the Object to be Analyzed>

First, an energy absorbing member included in a vehicle is described as an example of the cylindrical object to be analyzed of which the load characteristic is to be analyzed. FIG. 1 is a perspective view of an energy absorbing member 1. The energy absorbing member 1 is, for example, provided between a front bumper beam and a front frame of a vehicle; and when the vehicle has collided with a preceding vehicle, an obstacle, or other objects, the energy absorbing member 1 is crushed by receiving the collision load, and absorbs the collision energy. The energy absorbing member 1 also plays the role of transferring the collision load to the front frame efficiently when the collision load is large.

The energy absorbing member 1 is formed of a carbon fiber-reinforced plastic (CFRP) using a thermosetting resin and carbon fibers. The energy absorbing member 1 forms a circular cylindrical shape, and is configured by a plurality of layers being stacked in the diameter direction. The energy absorbing member 1 made of a CFRP like this may be a braided structure that is formed of braided strings and longitudinal strings using a fiber material and a thermoplastic resin, for example. When a collision load is inputted in the axial direction, the energy absorbing member 1 made of a CFRP is squashed while being broken successively from the tip side; thus, a crushing load appears. The energy absorbing member 1 made of a CFRP is buckled at smaller intervals than a crash box formed of a steel sheet or is broken successively, and can therefore achieve stable impact energy absorption with a limited load variation. Furthermore, the energy absorbing member 1 made of a CFRP has the characteristic that the remaining balance of squashing is relatively small and the amount of impact energy absorption per unit weight is large.

The reinforcing fibers used for the fiber-reinforced resin that forms the energy absorbing member 1 are not limited to carbon fibers. For example, other than carbon fibers, ceramic fibers such as glass fibers, organic fibers such as aramid fibers, and reinforcing fibers in which these are combined may be used.

The matrix resin of the fiber-reinforced resin that forms the energy absorbing member 1 may be either of a thermosetting resin and a thermoplastic resin. In the case of the thermosetting resin, as the main material, for example, an epoxy resin, an unsaturated polyester resin, a vinyl ester resin, a phenol resin, a polyurethane resin, a silicon resin, and the like are illustrated. The thermosetting resin may be one or a mixture of two or more of them. In the case where these thermosetting resins are used as the matrix resin, an appropriate curing agent or reaction accelerator may be added to the thermosetting resin.

In the case of the thermoplastic resin, as the main material, for example, polyolefin-based resins such as polyethylene and polypropylene, a polyvinyl chloride resin, an ABS resin, a polystyrene resin, an AS resin, polyamide-based resins such as nylon 6 and nylon 66, a polyacetal resin, a polycarbonate resin, thermoplastic polyester-based resins such as polyethylene terephthalate and polybutylene terephthalate, a PPS (polyphenylene sulfide) resin, a fluorine resin, a polyetherimide resin, a polyetherketone resin, a polyimide resin, a polyethersulfone resin, an aromatic polyamide resin, and the like are illustrated.

The thermoplastic resin may be one or a mixture of two or more of them. In the case where the thermoplastic resin is a mixture, a compatibilizing agent may be used in combination. In the thermoplastic resin, a bromine-based fire retardant, a silicon-based fire retardant, red phosphorus, or the like may be added as a fire retardant. For a member for an automobile for which mass production is relatively desired, it is preferable to use a thermoplastic resin from the viewpoints of the ease of molding and mass productivity.

The energy absorbing member 1 having a circular cylindrical shape is disposed such that the axial direction runs along the front-rear direction of the vehicle. The dimensions of the energy absorbing member 1 like this may be designed as appropriate in accordance with the size of the vehicle, the desired load characteristic, the weight of the energy absorbing member 1, etc. For example, the axial length of the energy absorbing member 1 is 100 to 200 mm, the diameter of the inner space is 40 to 70 mm, and the thickness is 3 mm.

The energy absorbing member 1 has, on the side of an end that may receive a collision load, a tapered portion 3 in which the diameter decreases with increasing proximity to the end (hereinafter, the end having the tapered portion 3 may be referred to as a "tip"). By the tapered portion 3 like this being provided, when pressure is applied to the tip surface of the energy absorbing member 1, peeling occurs easily between layers constituting the energy absorbing member 1. Thereby, a trigger for the breaking of the tip side of the energy absorbing member 1 is given, and the energy absorbing member 1 can be successively broken easily.

<2. Method for Analyzing a Load Characteristic>

(2-1. Outline)

Figure 2:
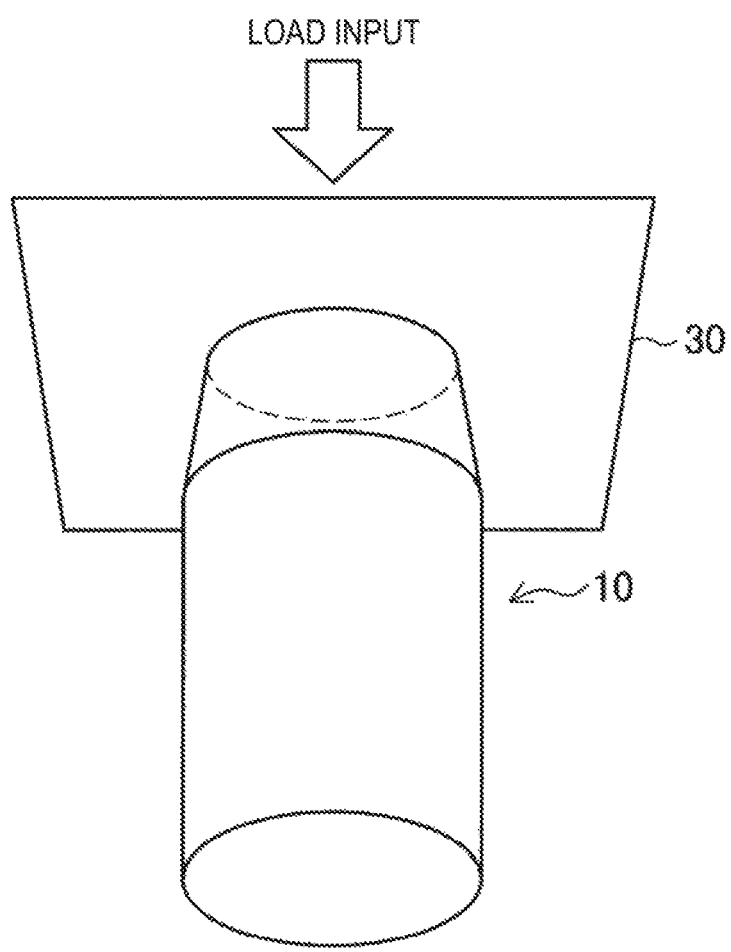
FIG. 2 is a diagram for describing a method for analyzing a crushing characteristic according to an implementation of the present invention.

Next, a method for analyzing, based on the finite element method, a load characteristic (F-S characteristic) when the energy absorbing member 1 is crushed in the axial direction is described. FIG. 2 illustrates a method of simulating the collision of the energy absorbing member 1 and computer-analyzing the load characteristic. The tip of an analysis model 10 is made a free end, and the rear end is made a fixed end. The load characteristic of the energy absorbing member 1 indicates the relationship between the amount of deformation of the analysis model 10 in which the energy absorbing member 1 is divided into quadrangular mesh cells (S: mm) and the applied load (F: kN) when, in a state where the tip of the analysis model 10 is thrust against an impactor 30, the impactor 30 is moved at a prescribed pressure in the axial direction of the energy absorbing member 1.

The analysis by the finite element method is performed by setting the analysis model and the analysis conditions. Specifically, the analysis code used for the collision analysis, the mesh, the shape of the object to be analyzed, and values such as the mass of the impactor, the load input speed (collision speed), and the elastic modulus, the tensile yield strength, the specific gravity, and the Poisson's ratio of the object to be analyzed are set. The property values of the energy absorbing member 1 can be measured by making a test piece.

(2-2. Detailed Description of the Issues)

Figure 3:
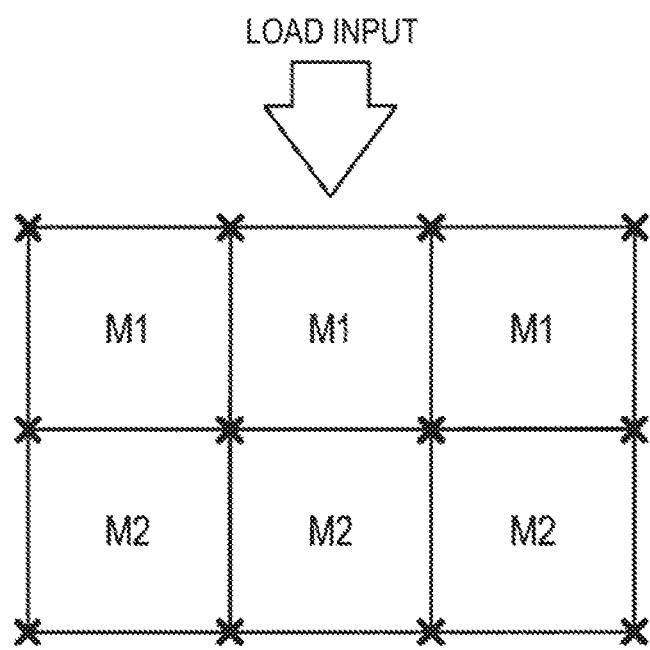
FIG. 3 illustrates a conventional mesh pattern.

When the load characteristic is analyzed by the finite element method, a common mesh pattern provides an analysis model in which mesh cells are disposed along the axial direction of the energy absorbing member 1 and the direction orthogonal to the axial direction. FIG. 3 is a schematic diagram illustrating the disposition of mesh cells in a common mesh pattern; specifically, mesh cells are disposed along the axial direction A and the direction orthogonal to the axial direction A.

In such a mesh pattern, a spike peak appears for each interval corresponding to the length of one side of the mesh cell (hereinafter, occasionally referred to as a "mesh cell size"). This is due to the fact that, in such a mesh pattern, the number of mesh cells M2 of the second stage to which the axial load (stress) can be transferred from a mesh cell M1 of the first stage is only one, and the increase in load and the decrease in load due to breaking are repeated at intervals corresponding to the length of one side of the mesh cell and the variation range of load is increased.

In this regard, although it may be possible to reduce the variation range of load and the noise by reducing the mesh cell size, excessive spike peaks appear again when the mesh cell size goes below a certain size; hence, this is not an effective measure.

Figure 4:
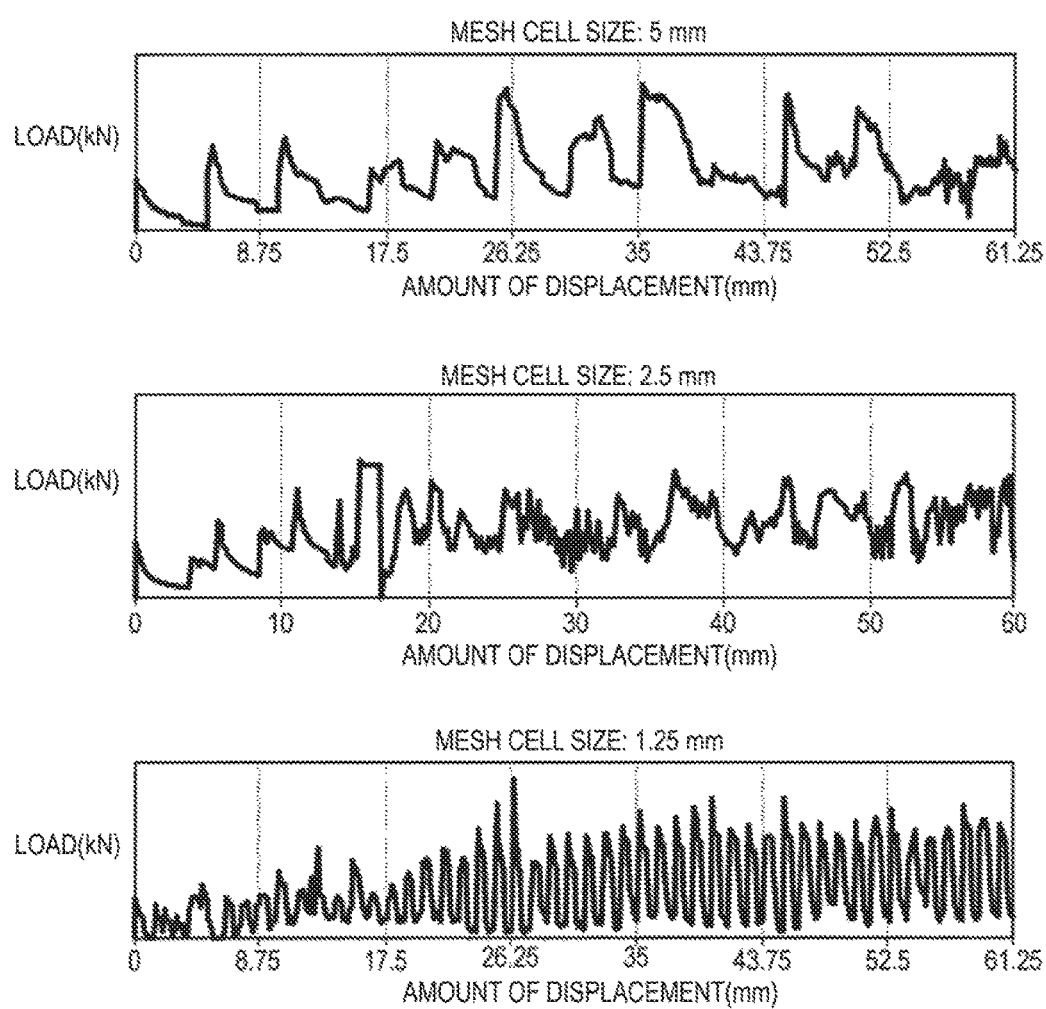
FIG. 4 illustrates the analysis results based on analysis models using conventional mesh patterns.

FIG. 4 illustrates the results obtained by an analysis in which analysis models are constructed using common mesh patterns and the finite element method is performed. The top of FIG. 4 is the analysis result when the mesh cell size is set to 5 mm, the middle of FIG. 4 is the analysis result when the mesh cell size is set to 2.5 mm, and the bottom of FIG. 4 is the analysis result when the mesh cell size is set to 1.25 mm.

It can be seen that, when the mesh cell size is set to 5 mm, spike peaks have appeared at intervals of 5 mm corresponding to the mesh cell size. It can be seen that, when the mesh cell size is set to a smaller value, 2.5 mm, the variation range of load has been reduced; on the other hand, when the mesh cell size is set to a still smaller value, 1.25 mm, spike peaks have appeared again. The reason for this is presumed to be as follows.

That is, the mesh cell size will influence the deformation of the mesh; and when the mesh cell size is set too small, the input of the load will be concentrated in some mesh cells. The concentrated load will turn the stress-strain region (SS region) of the material into the damage region, and will cause further deformation. As a result, after the mesh cells in which the load is concentrated are deformed sufficiently, these mesh cells will be removed simultaneously; consequently, an excessive spike will occur.

FIG. 5 is a diagram for describing the difference in the behavior of the deformation of the mesh between the case where an area is divided into four mesh cells (left side) and the case where the same area is not divided (right side). In the case where the mesh cell size is large (right side: the case of not being divided), the mesh cell is deformed surely, and can transfer the stress to the next mesh cell. On the other hand, in the case where the mesh cell size is small (left side: the case of being divided), the strain is concentrated in the upper two mesh cells, and successive breaking of mesh cells occurs in the same area. Thus, a spike peak appears each time when a mesh cell is broken.

Therefore, the spike peak of the load characteristic can be suppressed by selecting an appropriate mesh cell size in accordance with the configuration of the object to be analyzed and the properties of the constituent material. However, as can be seen from the analysis result of the middle of FIG. 4, the spike peak remains unable to be suppressed completely.

Furthermore, the energy absorbing member 1, which is the object to be analyzed in the implementation, is configured by a plurality of layers being stacked in the diameter direction; hence, to improve the precision of the analysis result of the load characteristic, it is necessary to consider not only the load characteristic of each layer but also the toughness between layers. Consequently, a large number of steps are needed for the analysis. In particular, the energy absorbing member 1 illustrated in FIG. 1 has the tapered portion 3 at its tip; therefore, in the analysis model in which the tapered shape is reproduced, it is likely that the waveform of the load characteristic will be out of phase between layers. As a result, the precision of the analysis result is likely to be further reduced.

For these issues, in the analysis method according to the implementation, an analysis model in which the disposition direction of mesh cells is inclined with respect to the axial direction is used. Thereby, for the load characteristic of the energy absorbing member 1 made of a CFRP, the shift and variation of the analysis result are reduced, and the precision of the analysis result can be improved.

(2-3. Analysis Model)

Figure 6:
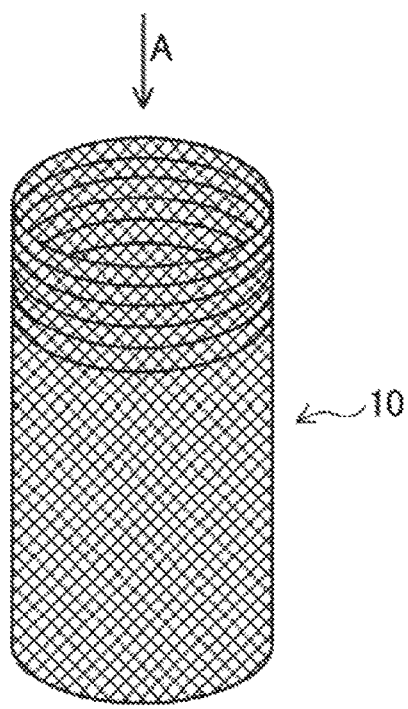
FIG. 6 illustrates an analysis model of an energy absorbing structure body according to the implementation.
Figure 7:
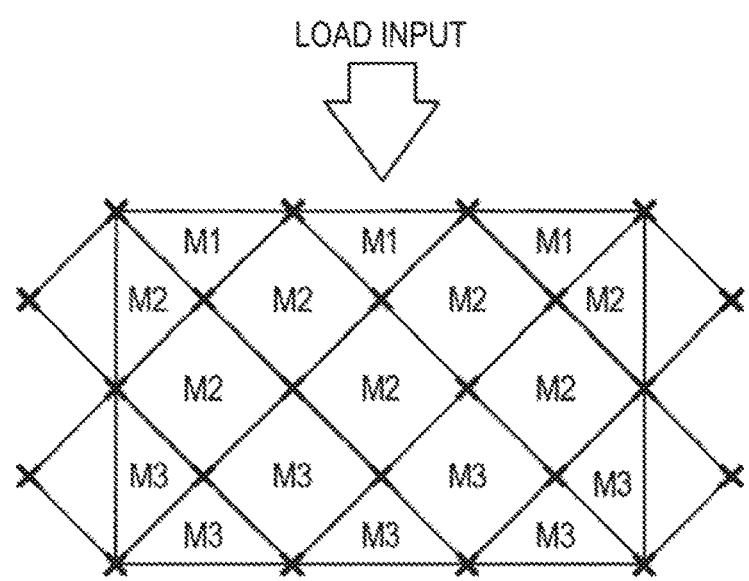
FIG. 7 illustrates a mesh pattern according to the implementation.

FIG. 6 illustrates the analysis model 10 used in the analysis method according to the implementation. The analysis model 10 like this is an example of the analysis model of the energy absorbing member 1 illustrated in FIG. 1. In the analysis model 10 like this, quadrangular mesh cells are disposed to be inclined with respect to the axial direction A, which is the load input direction. In the example illustrated in FIG. 6, the mesh cells are disposed to be inclined with respect to the axial direction A by 45°. FIG. 7 is a schematic diagram illustrating a mesh pattern of the analysis model 10.

In the mesh pattern of the analysis model 10 according to the implementation, the number of mesh cells M2 of the second stage to which the axial load (stress) can be transferred from a mesh cell M1 of the first stage is three. Further, also from a mesh cell M2 of the second stage, the axial load is transferred to three mesh cells M3 of the third stage in turn. Thus, the axial load is transferred from one mesh cell to other mesh cells dispersively. Further, by inclining the disposition of mesh cells with respect to the axial direction, even with the same mesh cell size, the interval at which the nodal point of the mesh appears in accordance with the axial displacement is made short as compared to the case where mesh cells are disposed along the axial direction and the direction orthogonal the axial direction. Therefore, the variation ranges of the increase in load and the decrease in load due to breaking are reduced.

Thus, by employing a mesh pattern in which the disposition direction of mesh cells is inclined with respect to the load input direction, the shift and variation of the load characteristic are reduced, and therefore even an object to be analyzed composed of a plurality of layers can be reproduced by one (one layer of) mesh pattern. Furthermore, by virtue of the reduction in the shift and variation of the load characteristic, even an object to be analyzed having a tapered shape can be reproduced by one mesh pattern. Therefore, the number of steps needed for the analysis of the load characteristic can be significantly reduced while the precision of the analysis result is ensured.

At this time, the mesh cell size may be set to an appropriate value beforehand in accordance with the shape of the object to be analyzed, the properties of the constituent material, etc. The mesh may be divided such that the number of mesh cells disposed along the round direction is invariant; thereby, the mesh cell size in the tapered portion 3 becomes smaller gradually in accordance with the diameter of the portion than the mesh cell size of the portion other than the tapered portion 3. Thus, also the load characteristic of the tapered portion 3 can be reproduced by one mesh pattern.

The angle of inclination of the disposition direction of mesh cells is not limited to 45°. By inclining the disposition direction of mesh cells with respect to the load input direction by an appropriate angle, the number of mesh cells to which the axial load can be transferred from one mesh cell can be made plural, and therefore the variation range of load can be reduced. However, if the disposition direction of mesh cells is excessively small (large), the axial load is likely to be transferred to one mesh cell concentratedly, and it becomes difficult to obtain the effect of reducing the variation range of load. Thus, the disposition direction of mesh cells should preferably be inclined with respect to the load input direction within the range of 30 to 60°, and should more preferably be inclined within the range of 40 to 50°.

(2-4. Behavior of the Load Characteristic)

Figure 8:
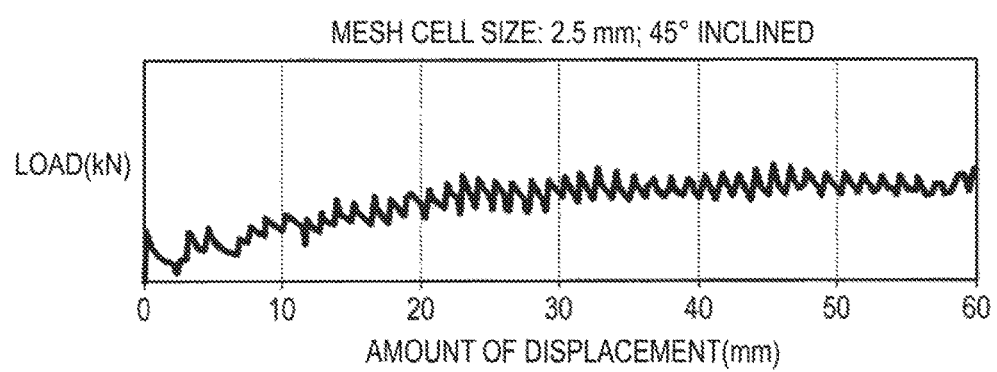
FIG. 8 illustrates the analysis result based on an analysis model using a mesh pattern according to the implementation.

FIG. 8 illustrates the analysis result of the load characteristic using an analysis model 10 in which the mesh cell size is set to 2.5 mm and mesh cells are disposed to be inclined with respect to the axial direction by 45°. In this analysis, the same analysis model as that in the analysis illustrated in FIG. 4 is used.

As illustrated in FIG. 8, in the method for analyzing a load characteristic according to the implementation, the variation range of load is significantly reduced as compared with the analysis result of the middle of FIG. 4, which is of an analysis model of the same mesh cell size. That is, it can be seen that, by the method for analyzing a load characteristic according to the implementation, the shift and variation of the load characteristic are reduced, and the precision of the analysis result is improved.

(2-5. Reliability of the Rigidity Region)

The fact that, in the analysis results mentioned above, there is practically no difference between the common mesh pattern and the mesh pattern according to the implementation in the rigidity region until breaking occurs in each mesh cell will now be described.

For the behavior after each mesh cell is broken, a difference in the analysis result due to the difference in the analysis model can appear; on the other hand, it is presumed that the behavior of load in the rigidity region basically does not vary. Thus, a test piece was reproduced by an analysis model of each mesh pattern, and a tensile test and a V-shaped bending test were performed to assess the reliability of the behavior of load in the rigidity region.

Figure 9:
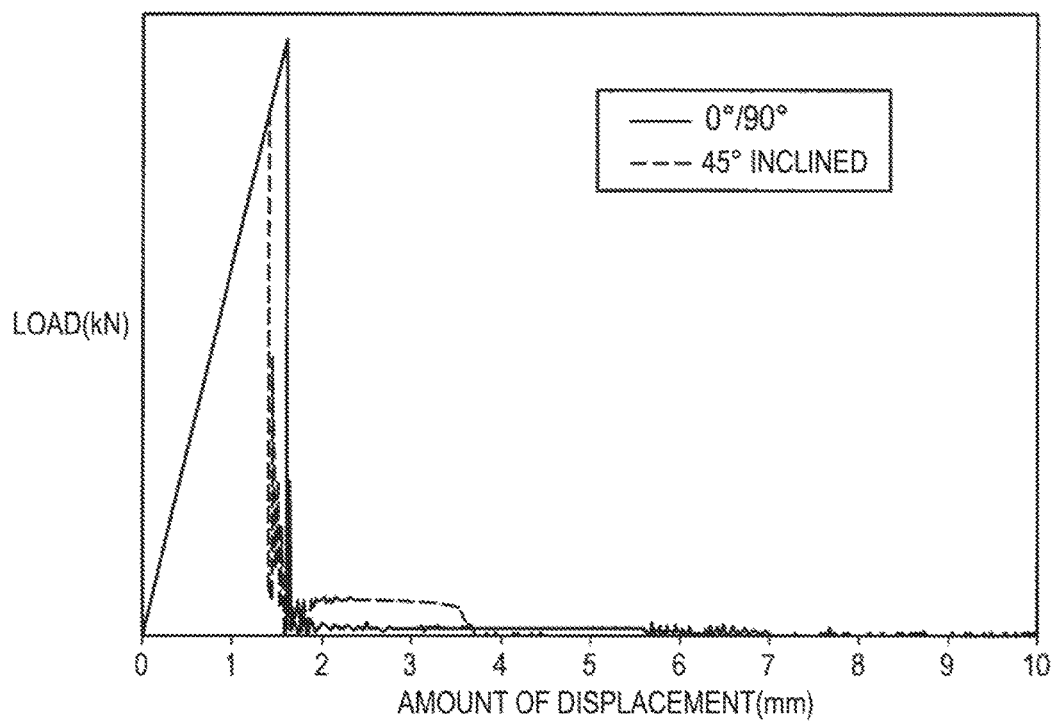
FIG. 9 illustrates the analysis results of a tensile test using test pieces.

FIG. 9 illustrates the analysis results of a tensile test using test pieces. In the tensile test, models in which a test piece with a length of 300 mm and a width of 50 mm is reproduced by a mesh pattern in which mesh cells are disposed along the length direction and the direction orthogonal to the length direction and a mesh pattern in which mesh cells are disposed to be inclined with respect the length direction by 45° are used. The horizontal axis of FIG. 9 represents the displacement (mm), and the vertical axis represents the tensile stress (kN). As illustrated in FIG. 9, there is practically no difference between the two models in the behavior of tensile stress in the region until breaking occurs.

Figure 10:
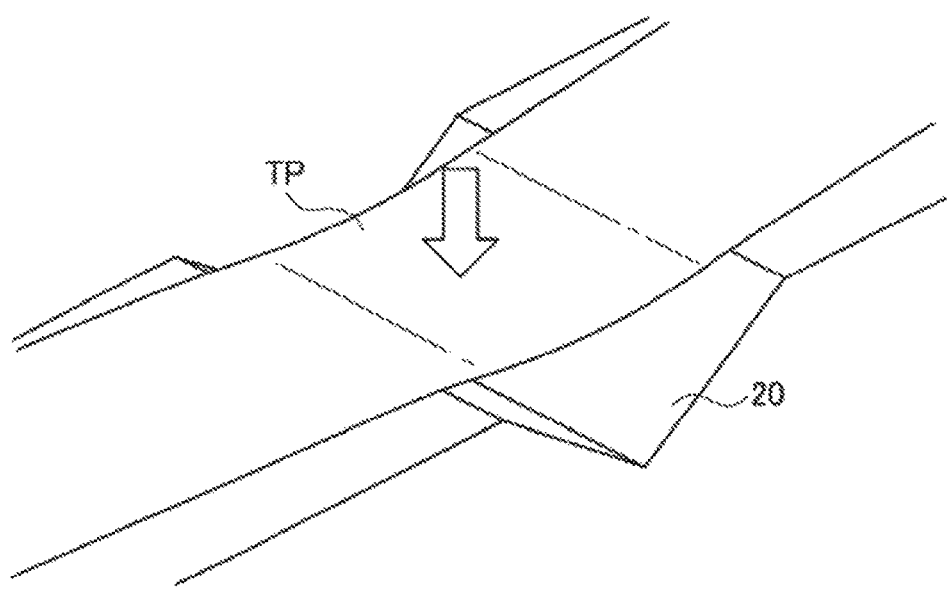
FIG. 10 is a diagram for describing a V-shaped bending test.
Figure 11:
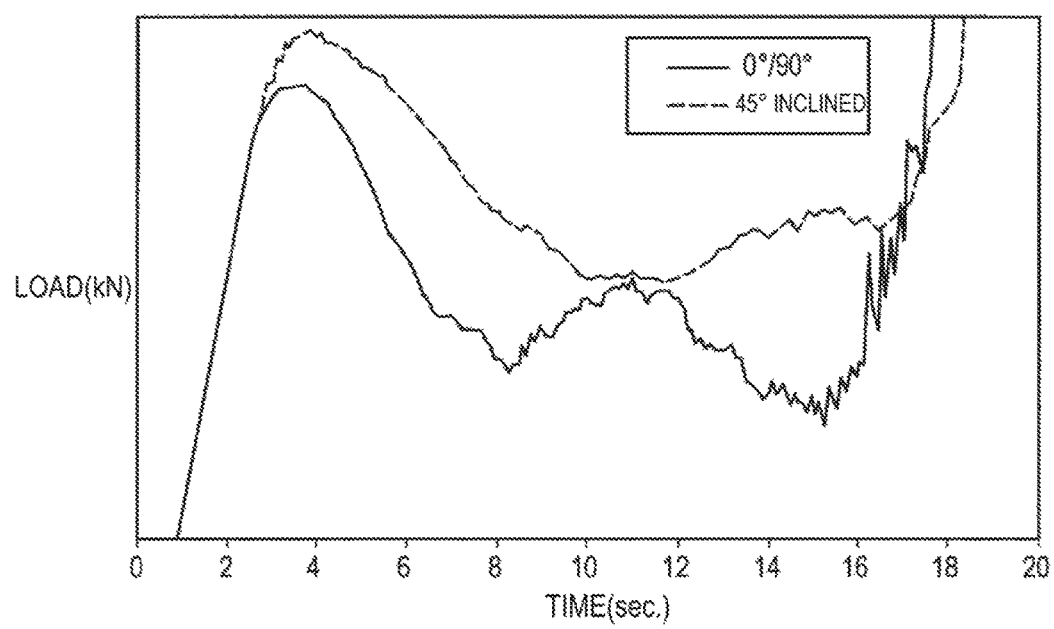
FIG. 11 illustrates the analysis results of a V-shaped bending test using test pieces.

FIG. 11 illustrates the analysis results of a V-shaped bending test using test pieces. In the V-shaped bending test, models in which a test piece with a length of 300 mm and a width of 50 mm is reproduced by a mesh pattern in which mesh cells are disposed along the length direction and the direction orthogonal to the length direction and a mesh pattern in which mesh cells are disposed to be inclined with respect to the length direction by 45° are used. The V-shaped bending test was performed by simulating the surface strain when, as illustrated in FIG. 10, the central portion of the test piece TP was disposed on a trench 20 with a width of 60 mm in such a manner that the extending direction of the trench 20 and the length direction of the test piece TP crossed, and the test piece TP was pressed from above. The horizontal axis of FIG. 11 represents time (seconds), and the vertical axis represents the strain. As illustrated in FIG. 11, there is practically no difference between the two models in the behavior of strain in the region until breaking occurs.

From the analysis results of these tests using test pieces, it can be seen that, even in the case where a mesh pattern in which mesh cells are disposed in a direction inclined with respect to the load input direction is used, there is practically no difference in the behavior of load in the rigidity region. On the other hand, a difference has arisen between the analysis models created by both mesh patterns in the tensile stress or the strain after breaking occurred, that is, after the strength reached a maximum. This is due to the fact that, as a result of inclining the disposition direction of mesh cells with respect to the load input direction, the number of mesh cells to which the axial load (stress) was transferred was increased, and consequently the load was transferred to a larger area.

(2-6. Analysis Results)

Figure 12:
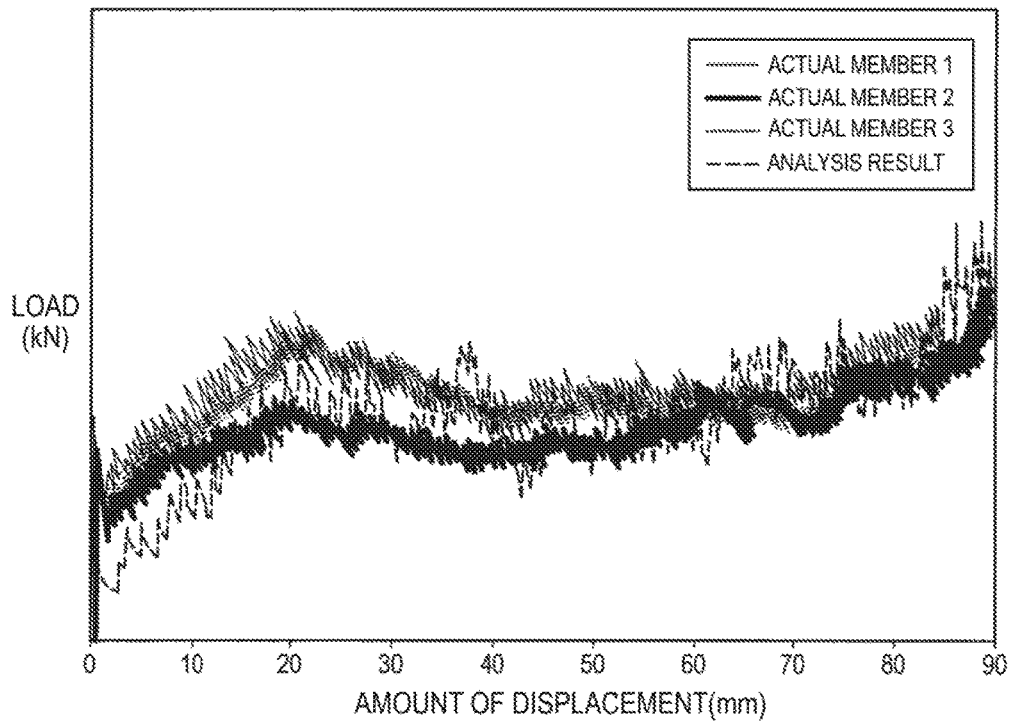
FIG. 12 is a diagram for describing the analysis results based on the method for analyzing a load characteristic according to the implementation.

FIG. 12 illustrates the analysis results of the load characteristic of the energy absorbing member 1 obtained by the analysis method according to the implementation. These analysis results are results obtained by creating the analysis model 10 like that illustrated in FIG. 6 using a mesh pattern in which the mesh cell size is set to 2.5 mm and mesh cells are disposed to be inclined with respect to the axial direction of the energy absorbing member 1 by 45° and performing a collision analysis. In FIG. 12, the solid line illustrates the analysis result obtained by the analysis method according to the implementation, and all of the broken line, the alternate long and two short dashes line, and the dotted line illustrate the results of measuring the load using actual energy absorbing members 1.

The energy absorbing member 1, which is the object to be analyzed, is the energy absorbing member 1 illustrated in FIG. 1 composed of a plurality of layers (herein six layers) and having the tapered portion 3 at its tip. The analysis is an axial crushing analysis under static conditions, using LS-DYNA, a versatile software application.

As illustrated in FIG. 12, it can be seen that the analysis result obtained by the analysis method according to the implementation exhibits high reproducibility with respect to the load characteristic of the actual energy absorbing members 1. That is, even for the energy absorbing member 1 made of a CFRP, composed of a plurality of layers, and having the tapered portion 3 at its tip, the load characteristic can be reproduced with high precision by the analysis model 10 created by one mesh pattern. Therefore, the number of steps needed for the analysis of the load characteristic can be significantly reduced.

<3. Analysis Model Creation Apparatus>

Figure 13:
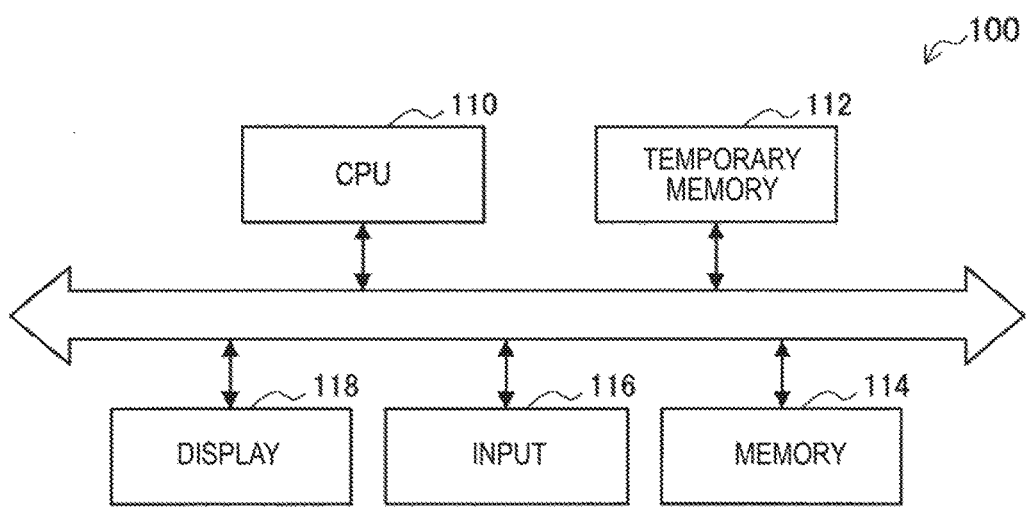
FIG. 13 illustrates a configuration example of an analysis model creation apparatus according to the implementation.

Next, a configuration example of an apparatus for creating the analysis model 10 of the cylindrical energy absorbing member 1 according to the implementation will now be described. FIG. 13 is a diagram illustrating, with functional blocks, a hardware configuration of an analysis model creation apparatus 100. The analysis model creation apparatus 100 includes a central processing unit (CPU) 110, a temporary memory 112, a memory 114, an input 116, and a display 118.

The memory 114 is formed of, for example, a hard disk drive in which a collision analysis program is installed. The installed collision analysis program is executed by the central processing unit 110. The temporary memory 112 is a part that stores the results of calculation by the central processing unit 110 and various set values, and is formed of, for example, a memory element such as a RAM or a ROM. The input 116 is, for example, a keyboard, and is a part that allows the user's instruction and character input to be inputted to the analysis model creation apparatus 100. The display 118 performs screen displaying on a display screen in accordance with the instruction of the central processing unit 110.

The central processing unit 110 forms a mesh pattern by executing the collision analysis program, and thereby creates the analysis model 10. The standard number of mesh cells of the mesh pattern is set to an appropriate value beforehand by the designer, and is stored in the temporary memory 112 or the like. The standard number of mesh cells can be expressed by, for example, at least one of the number of division in the half round of the cylinder, the total number of mesh cells for the half round, the number of nodal points at which mesh cells are in contact with each other, and the degree of freedom.

The central processing unit 110 reads the shape data of the object to be analyzed, and then forms a mesh pattern on the basis of the set standard number of mesh cells. At this time, a plurality of reference points that are offset with respect to the axial direction, which is the load input direction, by 45 degrees are specified, and a mesh pattern is formed such that mesh cells lie along the plurality of reference points. Thereby, the analysis model 10 in which mesh cells are disposed to be inclined with respect to the axial direction, which is the load input direction, by 45° is created.

By analyzing the load characteristic by the finite element method using the analysis model 10 thus created, the shift and variation of the analysis result are reduced relative to the load characteristic of the actual object to be analyzed. Therefore, even for the energy absorbing member 1 composed of a plurality of layers and having the tapered portion 3 at its tip, the load characteristic can be analyzed with good precision by one analysis model 10. As a result, the number of steps needed for the analysis of the load characteristic can be significantly reduced.

As described above, in the method for analyzing a load characteristic according to the implementation, the analysis model 10 in which mesh cells are disposed to be inclined with respect to the load input direction is used when the load characteristic related to the axial load of a cylindrical object to be analyzed is analyzed by the finite element method. Thereby, the number of mesh cells to which the axial load is transferred is increased, and the variation range of load can be suppressed to a low level. Therefore, the shift and variation of the analysis result with respect to the load characteristic of the actual object to be analyzed are reduced, and the precision of the analysis result can be improved.

Furthermore, by the analysis model creation apparatus 100 according to the implementation, an analysis model in which mesh cells are disposed to be inclined with respect to the load input direction is created as the analysis model 10 used when the load characteristic related to the axial load of a cylindrical object to be analyzed is analyzed by the finite element method. By analyzing the load characteristic using the analysis model 10 like this, the precision of the analysis result can be improved.

Thus, even in the case where the object to be analyzed is composed of a plurality of layers and/or has a tapered shape, the analysis result of the load characteristic can be obtained with high precision by using an analysis model created by one mesh pattern. Therefore, the number of steps needed for the analysis of the load characteristic can be significantly reduced.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A method, comprising:
   implementing a computer-analyzing a load characteristic including:
      reading specification of a plurality of mesh cells of a mesh pattern from a memory;
      generating, based on the specification of the plurality of mesh cells read from the memory, an analysis model of an energy absorbing member comprising a cylindrical object having a central axis extending along an axial direction of the cylindrical object, being formed of a fiber-reinforced plastic, and including a tapered portion at a tip in the axial direction and a non-tapered portion other than the tapered portion, wherein an entirety of the analysis model is specified by the mesh pattern consisting of the plurality of mesh cells having quadrangular shapes, wherein all sides of each of the plurality of mesh cells are inclined at an angle in a range from 30 degrees to 60 degrees with respect to the axial direction, and wherein a size of each of the plurality of mesh cells in the tapered portion is set to become smaller, responsive to a diameter of the tapered portion, than the size of each of the plurality of mesh cells in the non-tapered portion that has a diameter greater than the tapered portion; and
      analyzing, using a finite element method, the load characteristic that indicates a relationship between an amount of deformation of the analysis model and an inputted load force that is inputted as a load force applied to an entirety of the tip of the energy absorbing member in the axial direction, based on the analysis model, the inputted load force and property values of the energy absorbing member;
   designing a dimension of the energy absorbing member formed of the fiber-reinforced plastic based on the load characteristic, wherein the energy absorbing member includes the tapered portion and the non-tapered portion; and
   providing the energy absorbing member, formed of the fiber-reinforced plastic, between a front bumper beam of a vehicle and a front frame of the vehicle.

2. The method according to claim 1, wherein the all sides of each of the plurality of mesh cells are inclined at an angle of 45 degree with respect to the axial direction of the cylindrical object.

3. The method according to claim 2, wherein the cylindrical object comprises a plurality of layers in a diameter direction of the cylindrical object.

4. The method according to claim 2, wherein the cylindrical object to be analyzed is the energy absorbing member that is made of a carbon fiber-reinforced plastic.

5. The method according to claim 1, wherein the cylindrical object comprises a plurality of layers in a diameter direction of the cylindrical object.

6. The method according to claim 1, wherein the cylindrical object to be analyzed is the energy absorbing member that is made of a carbon fiber-reinforced plastic.

7. The method according to claim 1, further comprising reproducing the load characteristic of the load that is applied to the energy absorbing member based on the analysis.

* * * * *